(12) United States Patent
Nugier et al.

(10) Patent No.: US 12,304,251 B2
(45) Date of Patent: May 20, 2025

(54) PNEUMATIC TIRE TREAD FOR A HEAVY DUTY VEHICLE COMPRISING STONE-EXPELLING AND NOISE-PREVENTING PROTUBERANCES

(71) Applicant: COMPAGNIE GENERALE DES ETABLISSEMENTS MICHELIN, Clermont-Ferrand (FR)

(72) Inventors: Franck Nugier, Clermont-Ferrand (FR); Olivier Ropars, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 221 days.

(21) Appl. No.: 17/786,933

(22) PCT Filed: Dec. 11, 2020

(86) PCT No.: PCT/FR2020/052386
§ 371 (c)(1),
(2) Date: Jun. 17, 2022

(87) PCT Pub. No.: WO2021/123580
PCT Pub. Date: Jun. 24, 2021

(65) Prior Publication Data
US 2023/0028931 A1    Jan. 26, 2023

(30) Foreign Application Priority Data

Dec. 19, 2019   (FR) ........................................ 1914861

(51) Int. Cl.
*B60C 11/13* (2006.01)
*B60C 11/03* (2006.01)

(52) U.S. Cl.
CPC ...... *B60C 11/1307* (2013.01); *B60C 11/0309* (2013.01); *B60C 11/1323* (2013.01);
(Continued)

(58) Field of Classification Search
CPC . B60C 11/1323; B60C 11/1353; B60C 11/13; B60C 11/1307; B60C 11/0318;
(Continued)

(56) References Cited

U.S. PATENT DOCUMENTS

2005/0016656 A1 * 1/2005 Kuroki .................... B60C 11/04
152/548
2015/0158340 A1    6/2015 Kaji

FOREIGN PATENT DOCUMENTS

CN    101646573    2/2010
CN    202006702 U    10/2011
(Continued)

*Primary Examiner* — Cedrick S Williams
*Assistant Examiner* — Thomas Frank Schneider
(74) *Attorney, Agent, or Firm* — COZEN O'CONNOR

(57) ABSTRACT

A tire tread (1) for a heavy construction plant vehicle, and aims to improve both its ability to not retain stones in its voids, during off-road use, and its ability to dampen the noise that it generates, during on-road use. At least one longitudinal groove (6) of the tread (1) has a longitudinal distribution of protuberances (7), and any protuberance (7) has a height H' at least equal to 0.9 times the depth H of the groove (6) and has a first portion (71), having a height H1, a width W1 and a thickness T1, and a second portion (72), having a height H2, a width W2 and a thickness T2, satisfying the relationships: $H'=H1+H2$, $0.6*H' \leq H2 \leq 0.9*H'$, $W2 \geq 0.25*W$, $T2 \leq \min(3 \text{ mm}; 1/3*T1)$, $W1 \geq 0.5*W$, $T1 \geq H1$.

12 Claims, 3 Drawing Sheets

(52) U.S. Cl.
CPC ... *B60C 11/1353* (2013.01); *B60C 2011/1338* (2013.01); *B60C 2011/1361* (2013.01); *B60C 2200/06* (2013.01); *B60C 2200/065* (2013.01)

(58) Field of Classification Search
CPC ............. B60C 11/11; B60C 2011/1338; B60C 2011/1361; B60C 2011/133; B60C 2200/06; B60C 2200/065
See application file for complete search history.

(56) References Cited

FOREIGN PATENT DOCUMENTS

| | | | | |
|---|---|---|---|---|
| CN | 104691243 | 6/2015 | | |
| DE | 10 2007 016 930 | 10/2008 | | |
| DE | 102007016930 A1 | * 10/2008 | ......... | B60C 11/0309 |
| EP | 3178669 | 11/2016 | | |
| FR | 3008352 A1 | * 1/2015 | ......... | B60C 11/0302 |
| JP | 2003 165310 | 6/2003 | | |
| JP | 2003165310 A | * 6/2003 | | |
| JP | 2012020702 A | * 2/2012 | | |
| WO | WO 01/32448 | 5/2001 | | |
| WO | WO 2009/082394 | 7/2009 | | |
| WO | WO 2009/084666 | 7/2009 | | |

* cited by examiner

PNEUMATIC TIRE TREAD FOR A HEAVY DUTY VEHICLE COMPRISING STONE-EXPELLING AND NOISE-PREVENTING PROTUBERANCES

RELATED APPLICATIONS

This is a U.S. National Phase Application under 35 USC 371 of International Application PCT/FR2020/052386 filed on Dec. 11, 2020.

This application claims the priority of French application no. FR 1914861 filed Dec. 19, 2019, the entire content of all of which is hereby incorporated by reference.

FIELD OF THE INVENTION

The present invention relates to a tire tread for a heavy vehicle intended to carry heavy loads and to run on stony ground or on tarmacked ground, and, more particularly, to a tire tread for a construction plant vehicle of the mobile crane type intended to move from one construction site to another to lift heavy loads.

BACKGROUND OF THE INVENTION

A tread comprises at least one rubber-based material and is intended to constitute the peripheral part of a tire and to be worn away when its tread surface comes into contact with the ground.

A tread can be defined by three dimensions: a thickness, in a radial direction, a width, in a transverse direction, and a length, in a longitudinal direction. When a tread is integrated into the tire, the transverse direction is also called the axial direction, since it is parallel to the axis of rotation of the tire, and the longitudinal direction is also called the circumferential direction, since it is tangential to the circumference of the tire in the direction of running of the tire.

To ensure in particular satisfactory performance in terms of longitudinal grip, under engine torque and under braking torque, and in terms of transverse grip, it is necessary to form, in the tread, a tread pattern that is a more or less complex system of cuts, or voids, separating elements that are raised with respect to a bottom surface.

In the case of a tire tread for a heavy construction plant vehicle, the raised elements are generally blocks. A block is a volume of rubber material delimited by a contact face, which is contained in the tread surface, by a bottom surface, and by lateral faces connecting the contact face to the bottom surface. These blocks can be arranged so as to form longitudinal rows of blocks, these rows being separated in pairs by longitudinal voids, also called longitudinal grooves or more simply grooves. A longitudinal void has a mean line that is not necessarily rectilinear, having at each point a tangent that forms an angle of between 0° and 45° with the longitudinal direction. Furthermore, within one and the same longitudinal row of blocks, the blocks are usually separated in pairs by transverse voids. A transverse void has a mean line that is not necessarily rectilinear, having at each point a tangent that forms an angle of between 0° and 45° with the transverse direction. Thus the respectively longitudinal and transverse voids form a network of cuts separating the blocks.

The tread, integrated into the tire, is usually characterized geometrically by a transverse width $W_T$, in the transverse direction, and a radial thickness $H_T$, in a radial direction. The transverse width $W_T$ is defined as being the transverse width of the contact surface of the tread of the new tire with smooth ground, such as tarmacked ground, when the tire is subjected to nominal pressure and load conditions recommended, for example, by the "European Tire and Rim Technical Organization" or E.T.R.T.O. standard. The radial thickness $H_T$ is defined, by convention, as being the maximum radial depth measured in the voids, corresponding to the maximum radial block height. In the case of a tire for a construction plant vehicle of mobile crane type, and by way of example, the transverse width $W_T$ is at least equal to 300 mm and the radial thickness $H_T$ is at least equal to 20 mm, or even 25 mm.

The normal running conditions of a tire for a heavy vehicle of mobile crane type are generally mixed, both off-road, on stony ground, and on-road, on tarmacked ground.

When the tire is running on stony ground, its tread is likely to retain stones in its longitudinal and transverse voids, and in particular at the zones of intersection between a longitudinal void and a transverse void. These stones retained by the voids of the tread are then likely to create perforations in the tread, which can cause damage to the crown reinforcement of the tire, which is radially on the inside of the tread, and, ultimately, breakage of said crown reinforcement rendering the tire unusable. Devices for ejecting stones, in the form of protuberances of suitable shape and size, have been described in documents EP 3178669, WO 0132448 and WO 2009082394.

When the tire is running on tarmacked ground, at higher speed, its tread is likely to generate noise, in particular due to the presence of longitudinal voids in which airborne sound waves propagate. Devices for damping these sound waves, which are usually called anti-noise devices, often in the form of flexible obstacles forming an at least partial barrier in the longitudinal voids, have been described in documents WO 2013171172 and WO 2012001031.

SUMMARY OF THE INVENTION

The inventors have set themselves the objective of improving, for a tire tread for a heavy vehicle for mixed off-road and on-road use, both its ability to not retain stones in its voids, during off-road use, and its ability to dampen the noise that it generates, during on-road use.

This objective has been achieved by a tire tread for a heavy vehicle, which tread is intended to come into contact with the ground via a tread surface and comprises cuts delimiting rubber blocks that extend from a bottom surface in a radial direction, at least one cut being a longitudinal groove, delimited by two opposite lateral walls that are connected to each other by a groove bottom, and extending over the entire length L of the tread in a longitudinal direction, any longitudinal groove having a depth H, measured between the tread surface and the groove bottom in a radial direction, and a width W, measured between the two lateral walls in the tread surface in a transverse direction, at least one longitudinal groove comprising a longitudinal distribution of protuberances that bear against one or the other of the lateral walls, two consecutive protuberances, which do not necessarily bear against the same lateral wall, being spaced apart by a pitch P, any protuberance of the longitudinal groove extending radially outwards from the groove bottom over a height H' at least equal to 0.9 times the depth H of the groove and any protuberance of the longitudinal groove comprising a first portion, extending radially outwards from the groove bottom over a height H1, transversely towards the inside of the longitudinal groove from a lateral wall over a width W1 and longitudinally over a thickness T1, and a second portion, extending radially outwards from the first portion over a height H2, transversely towards the inside of the longitudinal groove from a lateral wall over a width W2 and longitudinally over a thickness T2, such that the following relationships are satisfied:

$H'=H1+H2$ $0.6*H'<=H2<=0.9*H'$ $W2>=0.25*W$ $T2<=\min(3\ mm;\ 1/3*T1)$ $W1>=0.5*W$ $T1>=H1$ The tread according to an embodiment of the invention essentially comprises, in at least one longitudinal groove, a longitudinal distribution of protuberances, each protuberance, bearing against one or the other of the lateral walls of the groove, having a dual function of anti-noise barrier and stone ejector. An anti-noise barrier contributes to the damping of the airborne sound waves propagating in the longitudinal groove, when the tire is running on tarmacked ground. The purpose of a stone ejector is to promote the ejection of stones retained in the voids, when the tire is running on stony ground, and to prevent them from attacking the groove bottom. The protuberances bear against one or the other of the lateral walls, and two consecutive protuberances, in the longitudinal direction, which do not necessarily bear against the same lateral wall, are spaced apart by a pitch P, the longitudinal distance between said two protuberances.

To ensure this dual function, each protuberance comprises a first, radially inner portion, bearing both on the groove bottom and on a lateral wall and ensuring the stone ejector function, and a second, radially outer portion, bearing both on the radially outer part of the first portion and on the same lateral wall and ensuring the anti-noise function.

All the geometric characteristics described below are measured on a tire tread in the new state.

The first, respectively second, portion of the protuberance is geometrically characterized by a height H1, respectively H2, in a radial direction, by a width W1, respectively W2, in the transverse direction, and a thickness T1, respectively T2, in the longitudinal direction. The heights, widths and thicknesses are average values measured in the corresponding directions.

According to a first essential feature, any protuberance of the longitudinal groove extends radially outwards from the groove bottom over a height H' at least equal to 0.9 times the depth H of the groove. The height H' of the protuberance is the sum of the respective heights H1 and H2 of the first portion and of the second portion, and corresponds to an average total height of the protuberance, this being able to be variable in the transverse and/or longitudinal directions. The depth H of the groove is the maximum depth measured between the tread surface and the radially innermost point of the groove bottom, in the longitudinal mean plane of the longitudinal groove. A protuberance height H' at least equal to 0.9 times the depth H of the longitudinal groove aims to ensure the presence of the protuberance over almost the entire depth of the groove, for good anti-noise barrier effectiveness.

A second feature is expressed by the inequality $0.6*H'<=H2<=0.9*H'$. In other words, the second portion has to have a height H2 at least equal to 60% and at most equal to 90% of the total height H' of the protuberance. Below 60%, the height H2 is insufficient to ensure a flexibility of the second portion that is adapted to the damping of the sound waves. Above 90%, the height H1 of the first portion becomes less than 10% of the height H', and this is insufficient to ensure the protection of the groove bottom.

A third feature is expressed by the inequality $W2>=0.25*W$. In other words, the second portion has to have a width W2 at least equal to 25% of the width W of the groove. From 25%, the first portion is wide enough, and therefore obstructs the longitudinal groove sufficiently to act as anti-noise barrier.

A fourth feature is expressed by the inequality $T2<=\min(3\ mm;\ 1/3*T1)$. In other words, the thickness T2 of the second portion has to remain less than 3 mm, on the one hand, and one third of the thickness T1 of the first portion, on the other hand. Beyond a thickness equal to 3 mm, the second portion becomes too rigid, and therefore insufficiently deformable with respect to noise damping. This deformability can also be advantageous, with respect to the stone ejector function, since a second flexible portion does not impede the mobility of the stones in the longitudinal groove and therefore does not interfere with their possible ejection. In addition, in order to ensure robust anchoring of the second portion on the first portion, it is advantageous for the thickness T2 of the second portion to be much less than the thickness T1 of the first portion: one third of the thickness T1 has been estimated as a relevant upper bound.

According to a fifth feature, the inequality $W1>=0.5*W$ has to be satisfied. The width W1 of the first portion has to be at least equal to 50% of the width W of the longitudinal groove, so as to ensure good transverse coverage of the groove bottom by the protuberance and, consequently, its protective effect with respect to stones trapped in the longitudinal groove.

The sixth feature is expressed by the inequality $T1>=H1$. The thickness T1 of the first portion has to be at least equal to its height H1, so as to ensure good longitudinal coverage of the groove bottom by the protuberance and, consequently, its protective effect with respect to stones trapped in the longitudinal groove.

Thus the combination of the essential features described above allows stepped protuberances, as described in the invention, to effectively ensure their dual function of anti-noise barrier and stone ejector.

According to a preferred embodiment, the protuberances of the longitudinal groove alternately bear against one or the other of the lateral walls. This alternate positioning of the protuberances on one and the other of the walls means that two consecutive protuberances do not bear against the same wall, but are in contact with opposite walls. This alternation guarantees an almost complete closure of the longitudinal groove, by covering the protuberances that are positioned on opposite walls, and therefore an almost total barrier to the propagation of sound waves.

Advantageously, the protuberances of the longitudinal groove are spaced apart in pairs by a pitch P at most equal to 0.1 times the length L of the tread. In the knowledge that, when the tire is subjected to nominal load and pressure conditions, the contact patch in which the tread is in contact with the ground has a longitudinal length of the order of 0.1 times the length L of the tread, this condition implies the presence of at least two protuberances in the contact patch closing the longitudinal groove in the contact patch and thus avoiding the formation of a pipe, between the tread and the ground, which is likely to generate noise. It should be noted that the pitch P between two consecutive protuberances is not necessarily constant.

Preferably, any protuberance of the longitudinal groove extends radially outwards from the groove bottom over a height H' equal to the depth H of the groove, and this ensures the presence of an anti-noise barrier over the entire depth of the longitudinal groove, resulting in optimum noise damping.

Advantageously, the second portion extends longitudinally over a thickness T2 at least equal to 1 mm Below a thickness of 1 mm, the anti-noise barrier becomes insufficiently mechanically robust.

Again advantageously, the second portion extends towards the inside of the longitudinal groove from a lateral wall over a width W2 at most equal to 0.75 times the width W of the longitudinal groove. Beyond a width equal to 75% of the width of the longitudinal groove, the anti-noise barrier becomes insufficiently mechanically robust.

Advantageously, the first portion extends longitudinally over a thickness T1 at most equal to 4 times the height H1. This condition makes it possible to limit the thickness, i.e. the longitudinal dimension, of the first portion, and therefore its volume relative to the volume of the longitudinal groove. This makes it possible to limit the reduction in the available voids volume and, consequently, the ability of the groove to store or drain any water or mud present on the ground.

According to a preferred embodiment, the first portion comprises lateral faces that form, with the transverse direction, an angle at most equal to 45°. In this case, the first portion has a pyramid shape, of which the inclined lateral faces make easier the mobility of the stones in the longitudinal groove, and therefore their ejection out of the tread, during running of the tire.

In the particular case of a longitudinal groove comprising at least one intersection with a transverse groove, any intersection of the longitudinal groove and a transverse groove is provided with a protuberance. Specifically, any intersection between the longitudinal groove and a transverse groove is a preferential zone for the trapping of stones. Consequently, it is advantageous to place a protuberance at this intersection that is particularly sensitive to the retention of stones.

In an advantageous variant of the preceding embodiment, the first portion extends towards the inside of the longitudinal groove from a lateral wall over a width W1 at most equal to 2 times the width W of the longitudinal groove. Under these conditions, the first portion covers both the bottom of the longitudinal groove and part of the bottom of the transverse groove, and therefore protects these two zones.

The disclosure also relates to a tire for a heavy vehicle, preferably a heavy construction plant vehicle of mobile crane type, which tire comprises a tread according to any one of the embodiments described above.

BRIEF DESCRIPTION OF THE DRAWINGS

Features of the invention are illustrated by the schematic FIGS. 1, 2A, 2B, 2C and 3, which are not drawn to scale.

DETAILED DESCRIPTION OF THE DRAWINGS

Figure 1:
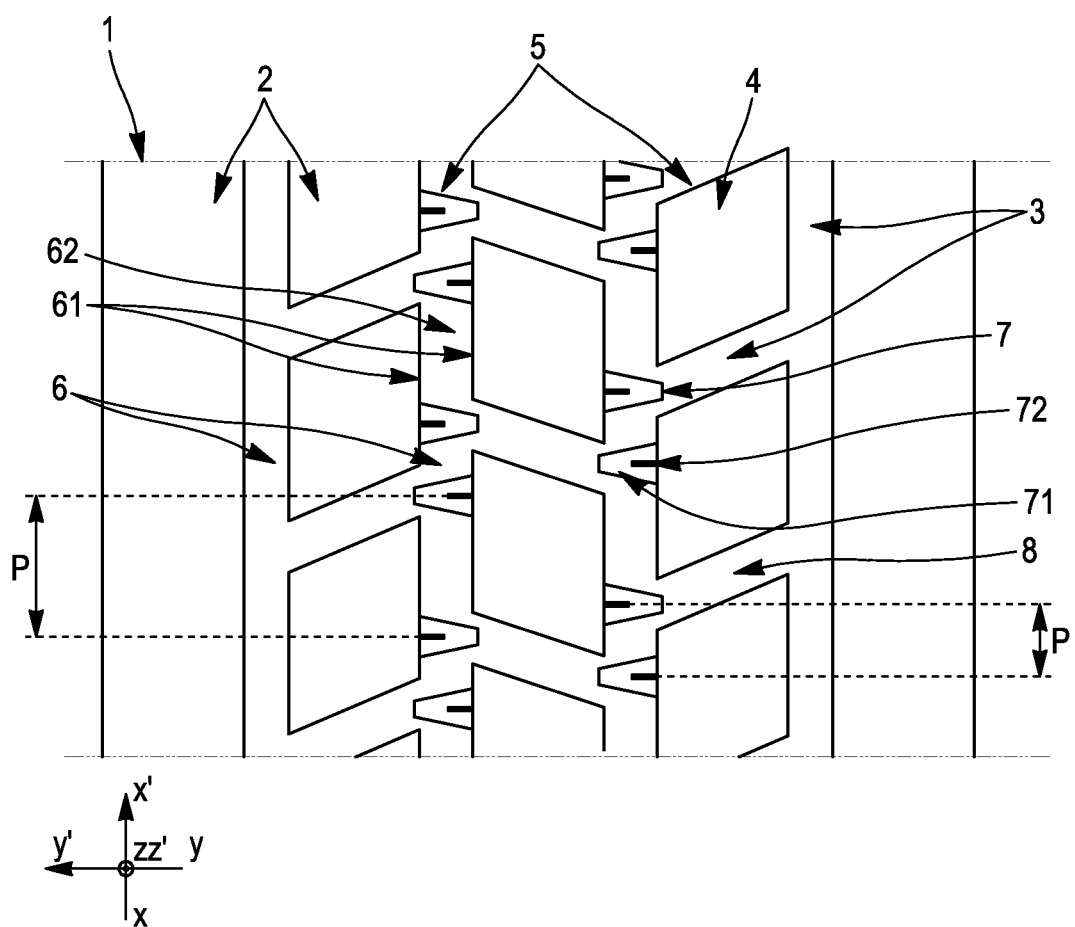
FIG. 1: View from above of a portion of a tread according to an embodiment of the invention.

FIG. 1 is a view from above of a portion of a tread 1 according to an embodiment of the invention. The tire tread 1 for a heavy vehicle, which tread is intended to come into contact with the ground via a tread surface 2, comprises cuts 3 delimiting rubber blocks 4 that extend from a bottom surface 5 in a radial direction ZZ'. The cuts 3 in the tread 1 are either longitudinal grooves 6 or transverse voids 8. In the embodiment shown, of the four longitudinal grooves 6, each delimited by two opposite lateral walls 61 that are connected to each other by a groove bottom 62, and extending over the entire length L of the tread 1 in a longitudinal direction XX', two of them, which are positioned in a central portion of the tread 1, each comprise a longitudinal distribution of protuberances 7 bearing alternately against one and the other of the lateral walls 61, two consecutive protuberances positioned respectively on two opposite lateral walls 61 being spaced apart by a pitch P. The pitch P is variable since said protuberances 7 are exclusively positioned, in the embodiment shown, at the intersection of a longitudinal groove 6 and a transverse void 8. Only the central longitudinal grooves are provided with protuberances 7, since the central portion is subjected to the highest contact pressures and is therefore the most sensitive to the retention of stones.

Figure 2A:
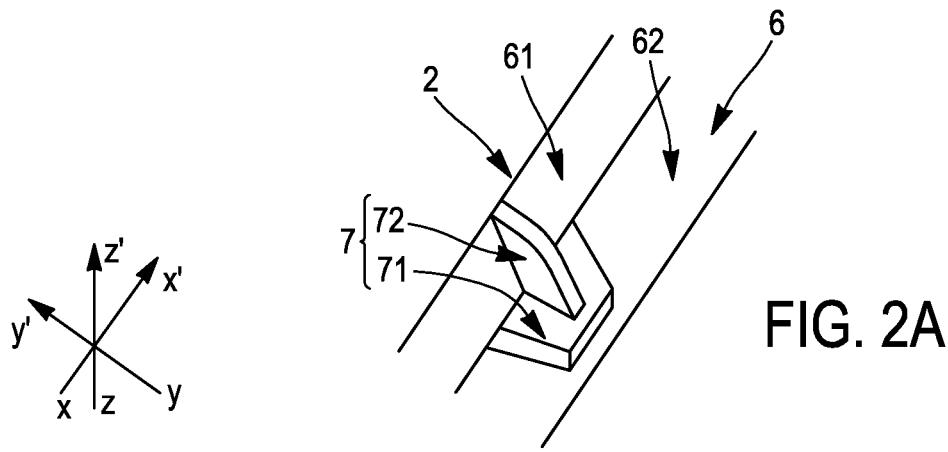
FIG. 2A: Perspective view of a protuberance of a longitudinal groove of a tread according to an embodiment of the invention.

FIG. 2A is a perspective view of a protuberance 7 of a longitudinal groove 6 of a tread according to an embodiment of the invention. The protuberance 7 of the longitudinal groove 6 comprises a first portion 71, extending radially outwards from the groove bottom 62 positioned on the bottom surface 5, and bearing on the lateral wall 61, and a second portion 72, extending radially outwards from the first portion 71 and bearing on the lateral wall 61. The first, radially inner portion 71 ensures the stone ejector function, and the second, radially outer portion 72 ensures the anti-noise function.

Figure 2B:
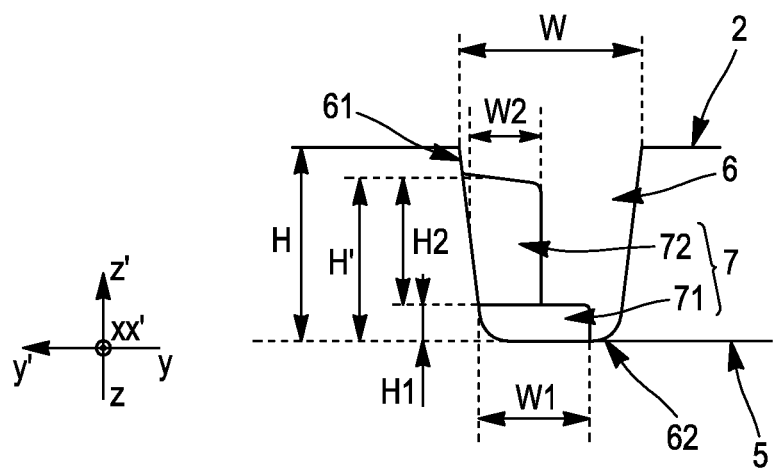
FIG. 2B: View in transverse cross section of a protuberance of a longitudinal groove of a tread according to an embodiment of the invention.

FIG. 2B is a view in transverse cross section of a protuberance 7 of a longitudinal groove 6 of a tread. The protuberance 7 of the longitudinal groove 6 extends radially, in the direction ZZ', outwards from the groove bottom 62 over a height H' at least equal to 0.9 times the depth H of the groove 6. The first portion 71 extends radially, in the direction ZZ', outwards from the groove bottom 62 over a height H1, and transversely, in the direction YY', towards the inside of the longitudinal groove 6 from a lateral wall 61 over a width W1. The second portion 72 extends radially, in the direction ZZ', outwards from the first portion 71 over a height H2 and transversely, in the direction YY', towards the inside of the longitudinal groove 6 from a lateral wall 61 over a width W2. According to the invention, the following relationships between the geometric characteristics described above are satisfied: $H'=H1+H2$, $0.6*H' \leq H2 \leq 0.9*H'$, $W2 \geq 0.25*W$ and $W1 \geq 0.5*W$.

Figure 2C:
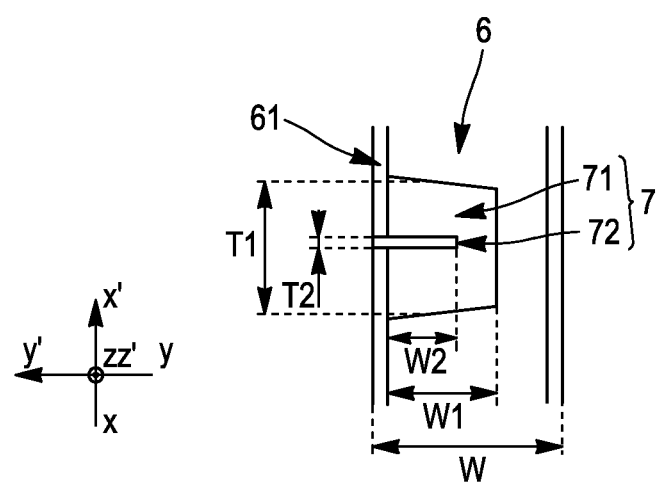
FIG. 2C: View from above of a protuberance of a longitudinal groove of a tread according to an embodiment of the invention.

FIG. 2C is a view from above of a protuberance 7 of a longitudinal groove 6 of a tread according to an embodiment of the invention. The first portion 71 extends transversely, in the direction YY', towards the inside of the longitudinal groove 6 from a lateral wall 61 over a width W1 and longitudinally, in the direction XX', over a thickness T1. The second portion 72 extends transversely, in the direction YY', towards the inside of the longitudinal groove 6 from a lateral wall 61 over a width W2 and longitudinally, in the direction XX', over a thickness T2. According to the invention, the following relationships between the geometric characteristics described above are satisfied: W2>=0.25*W, T2<=min (3 mm; 1/3*T1), W1>=0.5*W and T1>=H1.

Figure 3:
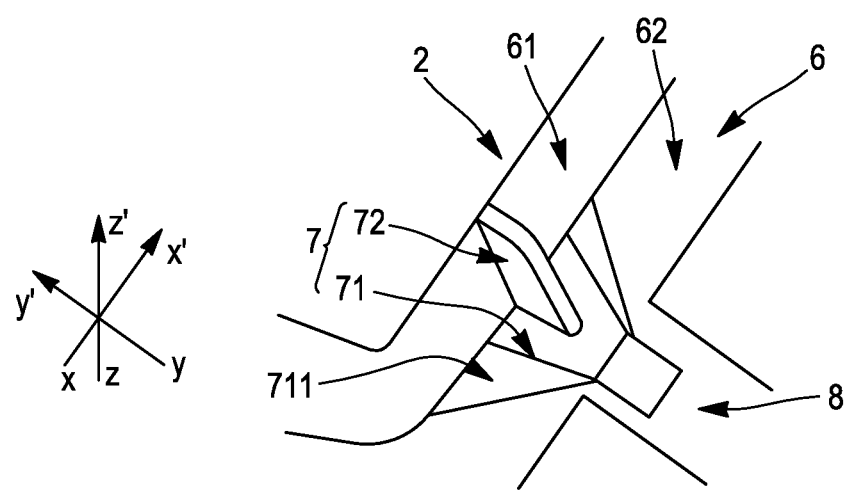
FIG. 3: Perspective view of a protuberance positioned at the intersection of a longitudinal groove and a transverse void according to a preferred embodiment of the invention.

FIG. 3 is a perspective view of a protuberance 7 positioned at the intersection of a longitudinal groove 6 and a transverse void 8 according to a preferred embodiment of the invention. The first portion 71 comprises lateral faces 711 that form, with the transverse direction YY', an angle at most equal to 45°. The first portion 71 has a pyramid shape, of which the inclined lateral faces 711 make easier the mobility of the stones in the longitudinal groove, and therefore their ejection out of the tread, during running of the tire. The second, anti-noise portion 72 has the same characteristics as above.

The inventors have more particularly studied this invention for a tire of size 445/95R25 intended to be mounted on a mobile crane. According to the ETRTO standard, such a tire has to be capable of carrying a load equal to 6700 kg, when it is inflated to a pressure equal to 9 bar.

The inventors compared, in the 445/95R25 tire size, a tire comprising a tread having a tread pattern with anti-noise and stone ejector protuberances, in accordance with the invention, and a reference tire comprising a tread having a tread pattern identical to that of the invention but without anti-noise and stone ejector protuberances.

Table 1 below presents the characteristics of an anti-noise and stone ejector protuberance of the tread according to the invention:

TABLE 1

| Characteristics of an anti-noise and stone ejector protuberance of the tread | Values |
| --- | --- |
| Depth H of the groove | 21 mm |
| Width W of the groove | 18 mm |
| Height H' of the protuberance | 21 mm |
| Height H2 of the second (anti-noise) protuberance portion | 13 mm |
| Width W2 of the second (anti-noise) protuberance portion | 6 mm |
| Thickness T2 of the second (anti-noise) protuberance portion | 1 mm |
| Height H1 of the first (stone ejector) protuberance portion | 8 mm |
| Width W1 of the first (stone ejector) protuberance portion | 18 mm |
| Thickness T1 of the first (stone ejector) protuberance portion | 24 mm |

The tire of the example studied has an outside diameter equal to 1471 mm, and this corresponds to a developed tread length L equal to 4621 mm. The tread comprises, in each of its two central longitudinal grooves and over its entire length L, 112 anti-noise and stone ejector protuberances alternately positioned on the opposite walls of the longitudinal groove, forming 56 pairs of protuberances forming 56 anti-noise barriers. When this tire is inflated to a pressure equal to 9 bar and subjected to a load equal to 6700 kg, the contact patch of its tread contains, for a given longitudinal groove, 3 pairs of protuberances, each forming an anti-noise barrier extending over almost the entire width of the longitudinal groove.

Compared with the reference tire, the tire in accordance with the invention generated an exterior noise that was 3 dB(A) lower, on a test of external noise of the "coast-by" type. Furthermore, a running test on ground covered with calibrated stones showed that the tread of a tire in accordance with the invention retained far fewer stones than that of the reference tire, without trapping of stones at the protuberances.

The tread according to the invention, which was developed for a conventional tire subjected to an inflation pressure, can also be used for a non-pneumatic tire, but also for a non-pneumatic rolling assembly intended to be fitted to an all-terrain vehicle, such as for example a caterpillar track.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread for a heavy vehicle, which tread is intended to come into contact with the ground via a tread surface and comprises cuts delimiting rubber blocks that extend from a bottom surface in a radial direction (ZZ'),
at least one cut being a longitudinal groove delimited by two opposite lateral walls that are connected to each other by a groove bottom and extending over an entire length L of the tread in a longitudinal direction (XX'),
any longitudinal groove having a depth H, measured between the tread surface and the groove bottom in the radial direction (ZZ'), and a width W, measured between the two lateral walls in the tread surface in a transverse direction (YY'),
at least one longitudinal groove comprising a longitudinal distribution of protuberances that bear against and extend axially from one or the other of the lateral walls, and two consecutive protuberances, which do not necessarily bear against the same lateral wall, being spaced apart by a pitch P,
wherein any protuberance of the at least one longitudinal groove extends radially outwards from the groove bottom over a height H' equal to the depth H of the at least one longitudinal groove and any protuberance of the at least one longitudinal groove comprises a first portion, extending radially outwards from the groove bottom over a height H1, transversely towards the inside of the at least one longitudinal groove from a lateral wall over a width W1 and longitudinally over a thickness T1, and a second portion, extending radially outwards from the first portion over a height H2, transversely towards the inside of the at least one longitudinal groove from the lateral wall over a width W2 and longitudinally over a thickness T2, wherein the first portion has a generally trapezoidal cross section viewed in the radial direction and the second portion has a rectangular cross section viewed in the radial direction, such that the following relationships are satisfied:

$H'=H1+H2$ $0.6*H'<=H2<=0.9*H'$ $W2>=0.25*W$ $T2<=\min(3 \text{ mm}; 1/3*T1)$ $W1>=0.5*W$ $T1>=H1$, and wherein the thickness T1 of the first portion is greater than the thickness T2 of the second portion.

2. The tread according to claim 1, wherein the protuberances of the at least one longitudinal groove alternately bear against one or the other of the lateral walls.

3. The tread according to claim 1, wherein the protuberances of the at least one longitudinal groove are spaced apart in pairs by the pitch P at most equal to 0.1 times the length L of the tread.

4. The tread according to claim 1, wherein the second portion extends longitudinally over the thickness T2 at least equal to 1 mm.

5. The tread according to claim 1, wherein the second portion extends towards the inside of the at least one longitudinal groove from the lateral wall over the width W2 at most equal to 0.75 times the width W of the longitudinal groove.

6. The tread according to claim 1, wherein the first portion extends longitudinally over the thickness T1 at most equal to 4 times the height H1.

7. The tread according to claim 1, wherein the first portion comprises lateral faces that form, with the transverse direction (YY'), an angle at most equal to 45°.

8. The tread according to claim 1, the at least one longitudinal groove comprising at least one intersection with a transverse groove, wherein any intersection of the at least one longitudinal groove and the transverse groove is provided with the protuberance.

9. The tread according to claim 8, wherein the first portion extends towards the inside of the at least one longitudinal groove from the lateral wall over the width W1 at most equal to 2 times the width W of the at least one longitudinal groove.

10. A tire for a heavy vehicle which tire comprises a tread according to claim 1.

11. The tread according to claim 1, wherein circumferential ends of the first portion taper axially.

12. The tread according to claim 1, wherein a radially outer face of the first portion is generally concentric to the tread surface.

* * * * *